United States Patent [19]
Memmel et al.

[11] Patent Number: 5,662,200
[45] Date of Patent: Sep. 2, 1997

[54] CLUTCH DISC OF A MOTOR VEHICLE, WHICH CLUTCH DISC HAS AN ELASTIC CONNECTION BETWEEN THE CARRIER PLATE AND HUB

[75] Inventors: Klaus Memmel, Forst-Schonungen; Günter Wawrzik, Schweinfurt; Winfried Stürmer, Euerbach; Harald Jeppe, Schweinfurt, all of Germany

[73] Assignee: Fichtel & Sachs AG, Schweinfurt, Germany

[21] Appl. No.: 499,305

[22] Filed: Jul. 7, 1995

[30] Foreign Application Priority Data

Jul. 8, 1994 [DE] Germany .................. 44 24 186.0

[51] Int. Cl.[6] ....................................... F16D 13/68
[52] U.S. Cl. .................. 192/209; 192/70.17; 464/85; 464/93
[58] Field of Search ................ 192/70.17, 200, 192/209, 210, 210.1, 211; 464/71, 85, 93, 98

[56] References Cited

U.S. PATENT DOCUMENTS

| | | | |
|---|---|---|---|
| 1,172,525 | 2/1916 | Hanchett | 192/200 X |
| 1,726,826 | 9/1929 | Hawkins | 192/209 X |
| 1,815,760 | 7/1931 | Burns | 192/209 |
| 1,862,991 | 6/1932 | Vargha | 192/209 |
| 1,925,278 | 9/1933 | Paton | 192/70.17 |
| 1,964,054 | 6/1934 | Harris . | |
| 2,104,106 | 1/1938 | Swennes | 192/209 |
| 2,567,168 | 9/1951 | Goodchild . | |
| 5,322,149 | 6/1994 | Szadkowski . | |

FOREIGN PATENT DOCUMENTS

| | | |
|---|---|---|
| 0823223 | 1/1938 | France . |
| 1040461 | 10/1953 | France . |
| 1048010 | 12/1953 | France . |
| 0027058 | 5/1884 | Germany . |
| 0609005 | 9/1948 | United Kingdom . |

*Primary Examiner*—Richard M. Lorence
*Attorney, Agent, or Firm*—Nils H. Ljungman and Associates

[57] ABSTRACT

The present invention generally relates to a clutch disc with an elastic connection between the carrier plate and the hub. The elastic connection is in the form of elastic elements, which elastic elements are fastened parallel to the axis of rotation by rivets.

20 Claims, 3 Drawing Sheets

CLUTCH DISC OF A MOTOR VEHICLE, WHICH CLUTCH DISC HAS AN ELASTIC CONNECTION BETWEEN THE CARRIER PLATE AND HUB

BACKGROUND OF THE INVENTION

1. Field of the Invention

The present invention generally relates to a clutch disc for a friction clutch, which friction clutch comprises a hub, a flange, and a carrier plate. The carrier plate holds friction linings and an elastic connection between the carrier plate and flange.

2. Background Information

A clutch disc of the type described above is disclosed, for example, in U.S. Pat. No. 1,964,054. On this clutch disc, for torsional damping, there are elastic torque transmission means in an area which overlaps axially between the carrier plate and the hub.

OBJECT OF THE INVENTION

The object of the present invention is to improve a clutch disc so that it is elastically flexible with regard to a possible axial offset or misalignment between the transmission shaft and the crankshaft.

SUMMARY OF THE INVENTION

The present invention teaches that, between the flange and the radially inner area of the carrier plate, there can preferably be one or more elastic elements which are in axial contact both with the flange and with the carrier plate by means of an essentially radial surface, and which are fastened by means of rivets which extend axially. Such a configuration can be essentially easy to manufacture, and a high degree of flexibility can be achieved through the use of rivet elements, so that a suitable design can essentially easily be achieved which can be adapted to the requirements of the particular vehicle application.

The present invention also teaches that there is preferably an elastic element in the form of a ring wheel which is oriented concentric to the axis of rotation, the outside diameter of which essentially equals the outside diameter of the flange, that the carrier plate runs on the side of the ring wheel farther from the flange and has an inside diameter which is equal to that of the ring wheel, and that alternating stepped rivets—distributed over the circumference—connect the ring wheel to the flange or to the carrier plate. Such a design has elastic characteristics which are equally good both in the radial direction and in the axial direction.

The present invention also teaches that there can be an elastic element in the form of a ring wheel which can be oriented concentric to the axis of rotation, whereby the flange can preferably have a smaller outside diameter than the inside diameter of the carrier plate, and the flange and the carrier plate can be aligned in the radial direction. The ring wheel can have a larger outside diameter than the inside diameter of the carrier plate. The ring wheel can have a smaller inside diameter than the outside diameter of the flange. The ring wheel can preferably be in contact on one axial side of the ring wheel with the flange and with the carrier plate. The ring wheel can also be fastened by means of one set of stepped rivets to the flange, and by means of one set of stepped rivets to the carrier plate. Such a design can essentially be particularly elastic in the axial direction and with regard to possible wobbling. Such a design can also be essentially compact, to the extent that the flange of the hub and the carrier plate can be aligned with one another in the radial direction.

The present invention also teaches that the carrier plate, on an intermediate diameter oriented concentric to the axis of rotation, can have several openings. The openings of the carrier plate can be distributed around the circumference of the carrier plate, into each of which openings an elastic element in the form of a bushing can be inserted. All the bushings can preferably be applied axially against the flange, and the bushings can be riveted to the flange by means of stepped rivets which can run through the bushings. Such a design can be essentially very flexible, in particular with regard to the adaptation to the respective vehicle, since the elasticity can essentially be regulated within a broad range by the number and location of the elastic bushings.

The present invention also teaches that the bushings can have an axial length that is greater than the thickness of the material of the carrier plate. In this manner, it is essentially possible to precisely control the elasticity.

The bushings can thereby be inserted into the openings so that the bushings can surround the openings in the radial direction, and thus achieve an essentially better axial hold.

The bushings can advantageously be vulcanized to the carrier plate.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a clutch assembly for a motor vehicle, which clutch assembly comprises a flywheel defining an axis of rotation and an axial direction parallel to the axis of rotation, a clutch disc, a pressure plate for applying an axially directed force to the clutch disc, with respect to the axis of rotation of the flywheel, to engage the clutch disc with the flywheel; the clutch disc being disposed between the flywheel and the pressure plate; the clutch disc having an outer periphery and friction linings; the friction linings being disposed at the outer periphery of the clutch disc; the friction linings for contacting the pressure plate and the flywheel during engagement of the clutch dieu with the flywheel; the friction linings comprising a radially inner edge disposed towards the axis of rotation of the flywheel; the radially inner edge of the friction linings comprising an inner circumference; a device for actuating the clutch disc to engage the friction linings between the pressure plate and the flywheel; the clutch disc further comprising: a hub having an axis of rotation, which axis of rotation of the hub is disposed parallel to the axis of rotation of the flywheel; the hub having a flange disposed to radially project from the hub; a carrier plate; a carrier plate being disposed to coaxially surround the hub; the carrier plate being disposed to substantially project in a radial direction with respect to axis of rotation of the hub; the carrier plate operatively connecting the friction linings to the hub; an elastic connecting apparatus for connecting the carrier plate and the flange; the elastic connection comprising at least one elastic element; the flange comprising an outer portion disposed a substantial radial distance from the axis of rotation of the hub; the carrier plate comprising an inner portion disposed substantially toward the axis of rotation of the hub; the at least one elastic element being disposed substantially between and in contact with the outer portion of the flange and the inner portion of the carrier plate; the at least one elastic element comprising an apparatus for providing a substantially radially elastic movement and a substantially axially elastic movement of the carrier plate with respect to the hub; a plurality of devices for fastening the elastic element to the flange; said plurality of devices for fastening having longitudinal axes being disposed substantially parallel to the axis of rotation of the hub.

Another aspect of the present invention resides broadly in a clutch assembly for a motor vehicle, which clutch assembly comprises: a flywheel defining an axis of rotation and an axial direction parallel to the axis of rotation; a clutch disc; a pressure plate for applying en axially directed force to the clutch disc, with respect to the axis of rotation of the flywheel, to engage the clutch disc with the flywheel; the clutch disc being disposed between the flywheel and the pressure plate; the clutch disc comprising an outer periphery and friction linings being disposed at the outer periphery of the clutch disc; the friction linings for contacting the pressure plate and the flywheel during engagement of the clutch disc with the flywheel; the friction linings comprising a radially inner edge disposed towards axis of rotation of the flywheel; the radially inner edge of the friction linings comprising an inner circumference; an apparatus for actuating the clutch disc to engage the friction linings between the pressure plate and the flywheel; the clutch disc further comprising: a hub having an axis of rotation, which axis of rotation of the hub is disposed parallel to the axis of rotation of the flywheel; a carrier plate; the carrier plate being disposed to coaxially surround the hub; an apparatus for fastening the hub to the carrier plate; the carrier plate operatively connecting the friction linings to the hub; the clutch disc having a first radial distance; the first radial distance of the clutch disc being disposed between the inner circumference of the friction linings and the hub; the first radial distance comprising at least a substantial portion of the total distance between the inner circumference of the friction linings and the hub; the fastening apparatus comprising a device for providing a substantially radially elastic movement and a substantially axially elastic movement of the carrier plate with respect to the hub; the fastening device having a radial width; the radial width of the fastening device comprising a second radial distance; the second radial distance being substantially smaller than the first radial distance.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENT

Figure 1:
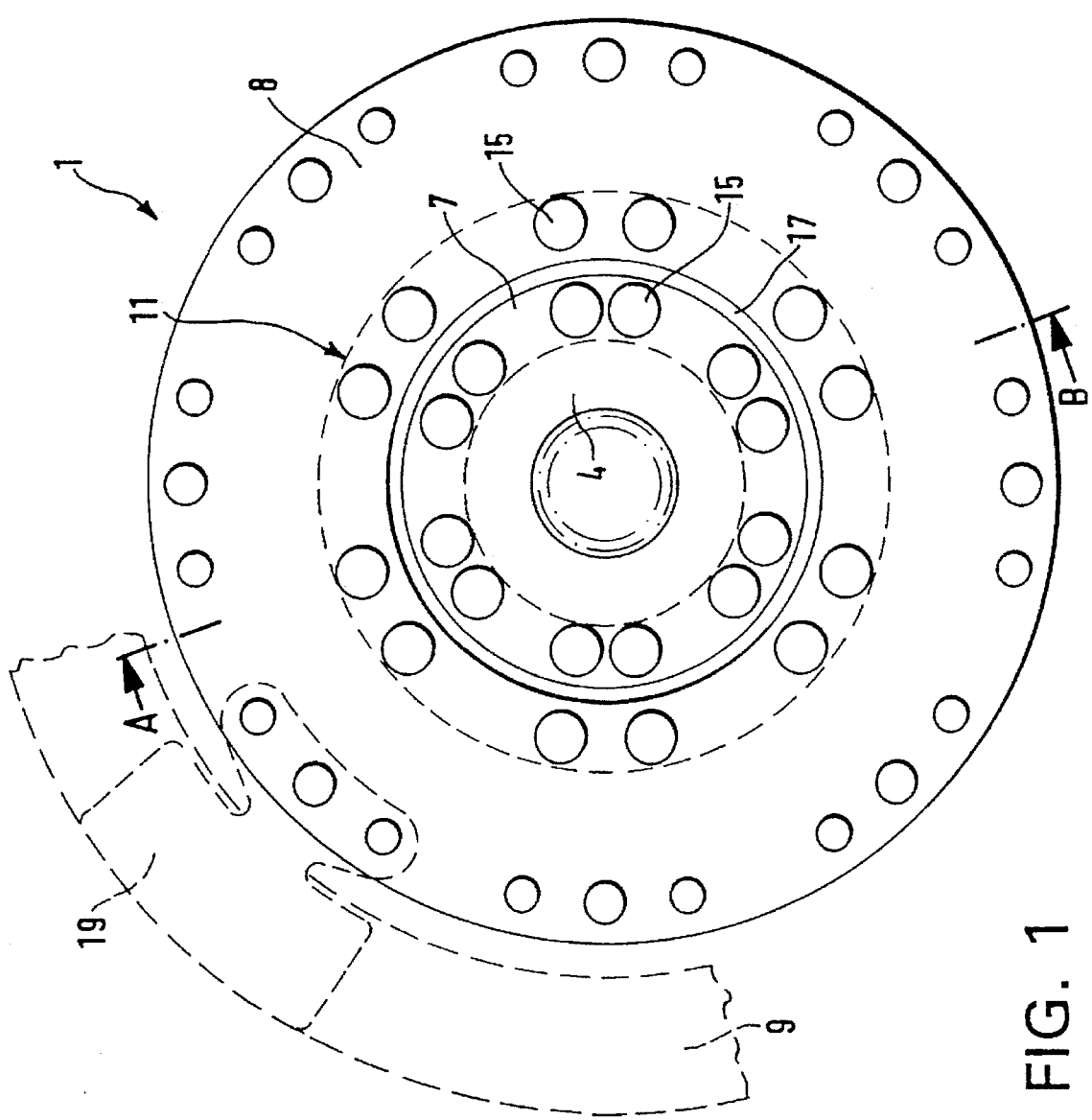
FIG. 1 shows a partial plan view of a clutch disc.
Figure 1A:
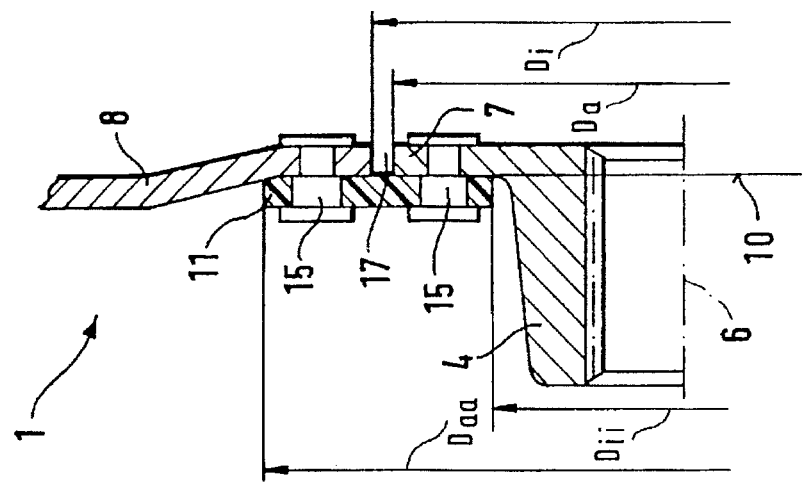
FIG. 1a shows a partial sectional view of the clutch disc as shown in FIG. 1.

FIG. 1 shows a partial section of a clutch disc 1. FIG. 1a shows a longitudinal section along Line A-B as shown in FIG. 1. The clutch disc 1 can include a hub 4 which can have internal gear teeth for non-rotational attachment to a transmission shaft (not shown). The hub 4 can be oriented concentric to an axis of rotation 6. The hub 4 can have a radially projecting flange 7, which flange 7, in this case, can be located on one axial terminal area of the hub 4, But it is also essentially possible for the flange 7 to be oriented so that parts of the hub 4 can essentially extend in both axial directions. The carrier plate 8 can preferably be oriented so that it can be aligned radially with the flange 7, whereby the inside diameter Di of the carrier plate 8 can preferably be somewhat larger than the outside diameter Da of the flange 7. Thus, there can preferably be an encircling radial gap or clearance 17.

The carrier plate 8 can be provided radially outwardly with individual spring segments 19, which spring segments 19 can be distributed over the circumference, and which spring segments 19 can essentially support friction linings 9. Such spring segments 19, for holding friction linings 9, will be generally well-known to those of ordinary skill in the art, and thus will not be described any further herein. The orientation of the friction linings 9 can correspond essentially to the embodiment illustrated in FIG. 2. The connection between the hub 4 and the carrier plate 8 can preferably be created by means of a ring wheel 11, which ring wheel 11 can preferably be made of elastomer material. The ring wheel 11 can preferably be in contact from one axial side with a radial surface 10 of the flange 7. The radial surface 10 of the flange 7 can extend radially outwardly to the carrier plate 8.

As shown in FIG. 1a, the outside diameter Daa of the ring wheel 11 can be essentially greater than the inside diameter Di of the carrier plate 8. Likewise, the inside diameter Dii of ring wheel 11 van be essentially smaller than the outside diameter Da of the flange 7. The ring wheel 11 can thereby essentially overlap both the carrier plate 8 and the flange 7, both radially outwardly and radially inwardly.

In this area of overlap, on each of two concentric diameters, there can be a set of stepped rivets 15, which stepped rivets 15 can extend with their larger diameter in corresponding openings of the ring wheel 11. The stepped rivets 15 can be in contact by means of their steps with the radial surface 10. The stepped rivets 15 can be riveted into the material of the carrier plate 8 or of the flange 7 respectively. By means of a head which has a larger diameter, the stepped rivets 15 can surround, grasp, or embrace the ring wheel 11 from the side of the ring wheel 11 farther from the radial surface 10, and the stepped rivets can thereby hold the ring wheel 11 in place.

During operation, a torque can be applied to the clutch disc 1, which torque can be transmitted from the carrier plate 8 to the hub 4 by means of the ring wheel 11. If there is an alignment error between the axis of rotation 6 of the hub 4 and the crankshaft of the internal combustion engine, the ring wheel 11 can essentially permit an adjustment, compensation, or equalization of this alignment error. This adjustment is possible on one hand in the purely radial direction, since there preferably exists a gap 17 between the inside diameter Di of the carrier plate 8 and the outside diameter Da of the flange 7. But this adjustment is also possible, when there is essentially an angular offset between the axes of rotation, to essentially compensate for a wobbling motion. The gear teeth between the hub 4 and the transmission shaft can thereby be protected against excessive wear. At the same time, it is essentially possible to suppress transmission noises which can be generated by rigid plates if, during operation of the clutch, the clutch engagement process ends in an incorrectly centered position.

As shown in FIGS. 1 and 1a, therefore, in accordance with an embodiment of the present invention, the flange 7 can radially project from an end area of hub 4, or, alternatively, the flange 7 can be located on the hub 4 in a manner such that hub 4 can axially extend from both sides of flange 7. The carrier plate 8 can preferably be aligned with flange 7 whereby carrier plate 8 and flange 7 can preferably lie in the same radial plane. The inner dieter Di of carrier plate 8 can preferably be larger than the outer diameter Da of flange 7. The ring wheel 11 can preferably comprise an elastomer wheel, which ring wheel 11 can have an outer diameter Dad and an inner diameter Dii. The outer diameter Dad of ring wheel 11 can preferably surround the inner diameter Di of carrier plate 8. The inner diameter Dii of ring wheel 21 can preferably be located concentrically within outer diameter Da of flange 7. By disposing ring wheel 11 in such a manner with respect to carrier plate 8 and flange 7, the ring wheel 11 can essentially overlap both the carrier plate 8 and flange 7. The ring wheel 11 can be fastened by rivets 15, which ring wheel 11 can thereby essentially form an elastic connection between carrier plate 8 and flange 7. As a result of the differences between the inner diameter Di of carrier plate 8 and the outer diameter Da of flange 7, a radial gap or clearance 17 can thereby essentially be formed in the plane between carrier plate 8 and flange 7. The elastomer material of ring wheel 11 can essentially provide ring wheel 11 with the capability of adjusting to a radial or angular offset between the axis of rotation 6 of hub 4 and the axis of rotation of the crankshaft.

in accordance with at least one embodiment of the present invention, the elastomer material utilized in accordance with the present invention can preferably comprise an elastic rubber-like substance such as a synthetic rubber or a plastic having some of the physical properties of natural rubber. The elastomer material utilized in accordance with the present invention may, for example, comprise an elastomeric compound such as a polymer.

Figure 2:
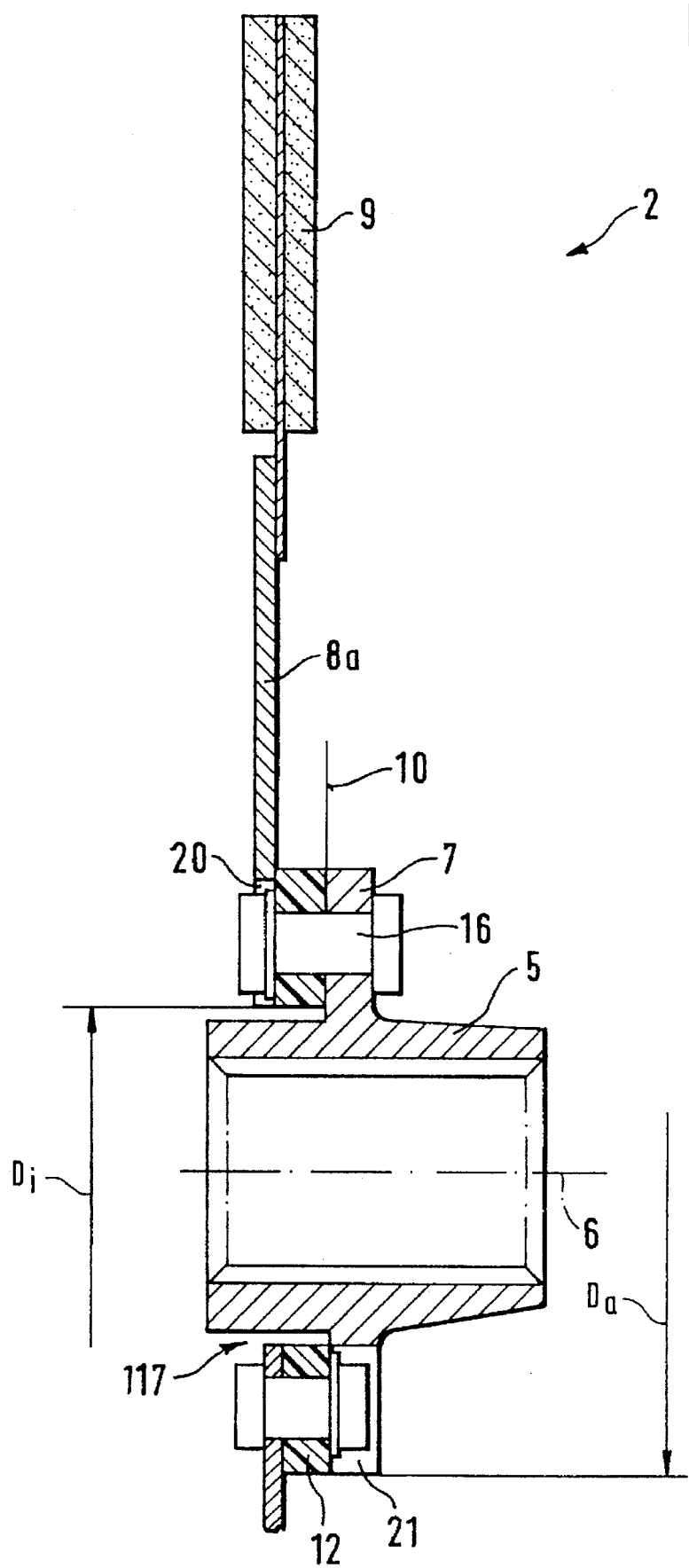
FIG. 2 is a partial longitudinal section of one variant embodiment.

FIG. 2 illustrates the upper half of a longitudinal section of a clutch disc 2. This clutch disc 2 includes a hub 5, which hub 5, approximately in the center of its longitudinal extension, can have a flange 7, which flange 7 can project radially. The hub 5 can preferably define an axis of rotation 6. Concentric to the axis of rotation 6 and to the hub 5 is a carrier plate 8a which can have an inside diameter Di, which inside diameter Di of carrier plate 8 can be essentially somewhat larger than the outside diameter of the hub 5 in this area. The flange 7 of the hub 5 can have a surface 10 which can run approximately radially. The flange 7 can be oriented axially with respect to the radially inner area of the carrier plate 8. In this radially inner area, there can preferably be a ring wheel 12 which can preferably be made of elastic material. The inside diameter of which ring wheel 12 also preferably equals the value Di of the carrier plate 8, so that between the ring wheel 12 and the carrier plate 8a, there can remain a gap 117 with respect to the hub 4.

The drive or carrier plate 8a and the hub 5 can be fastened by a series or row of rivets 16, the longitudinal axes of which rivets 16 can run parallel to the axis of rotation 6. The rivets 16 can alternately rivet the flange 7 to the ring wheel 12 and rivet the carrier plate 8a to the ring wheel 12. For the of such alternate riveting, in the radially inner area of the carrier plate 8a, there can be alternating openings 20. The alternating openings 20 can essentially provide a space for the rivet heads of those rivets 16 which are essentially anchored in the flange 7. Likewise, in alternation in the flange 7—offset from the openings 20 in the carrier plate—there are preferably openings 21 which can essentially provide a space for rivet heads, the rivets of which rivet heads can be connected to the carrier plate 8a. The elastic ring wheel 12 can essentially permit the compensation of a radial or angular offset between the axis of rotation 6 of the hub 5 and the axis of rotation of the crankshaft. The carrier plate 8a with its friction linings 9 can thus be adjusted in terms of its clamping, fixing, or chucking to the crankshaft.

As shown in FIG. 2, in accordance with an embodiment of the present invention, the carrier plate 8a can have an inner diameter Di, which inner diameter Di can preferably surround the hub 5. The inner diameter Di of carrier plate 8a can preferably be larger than the outer diameter of hub 5. In addition, the inner diameter Di of carrier plate 8a can be essentially equal to the inner diameter of elastic ring wheel 12, which ring wheel 12 can also preferably surround hub 5. As a result of the differences between the inner diameter Di and the outer diameter of hub 5, a gap 117 can thereby essentially be formed between inner diameter Di and the outer diameter of hub 5. The gap 117 can essentially provide the elastic ring wheel 12 with a clearance or play. As a result of the clearance or play, the elastic ring wheel 12 can essentially moveably adjust and ring wheel 12 can thereby compensate for a radial or angular offset between the axis of rotation 6 of hub 5 and the axis of rotation of the crankshaft.

Figure 3A:
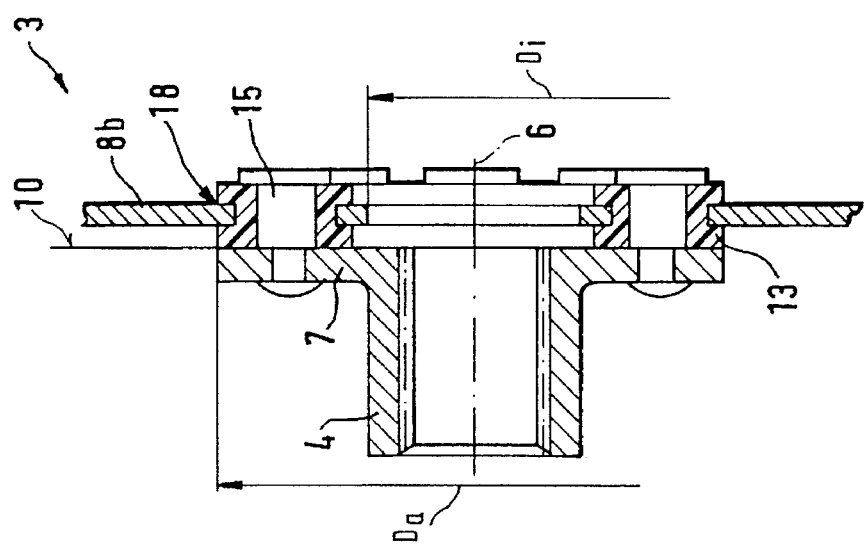
FIG. 3a shows a partial sectional view of the embodiment shown in FIG. 3.
Figure 3:
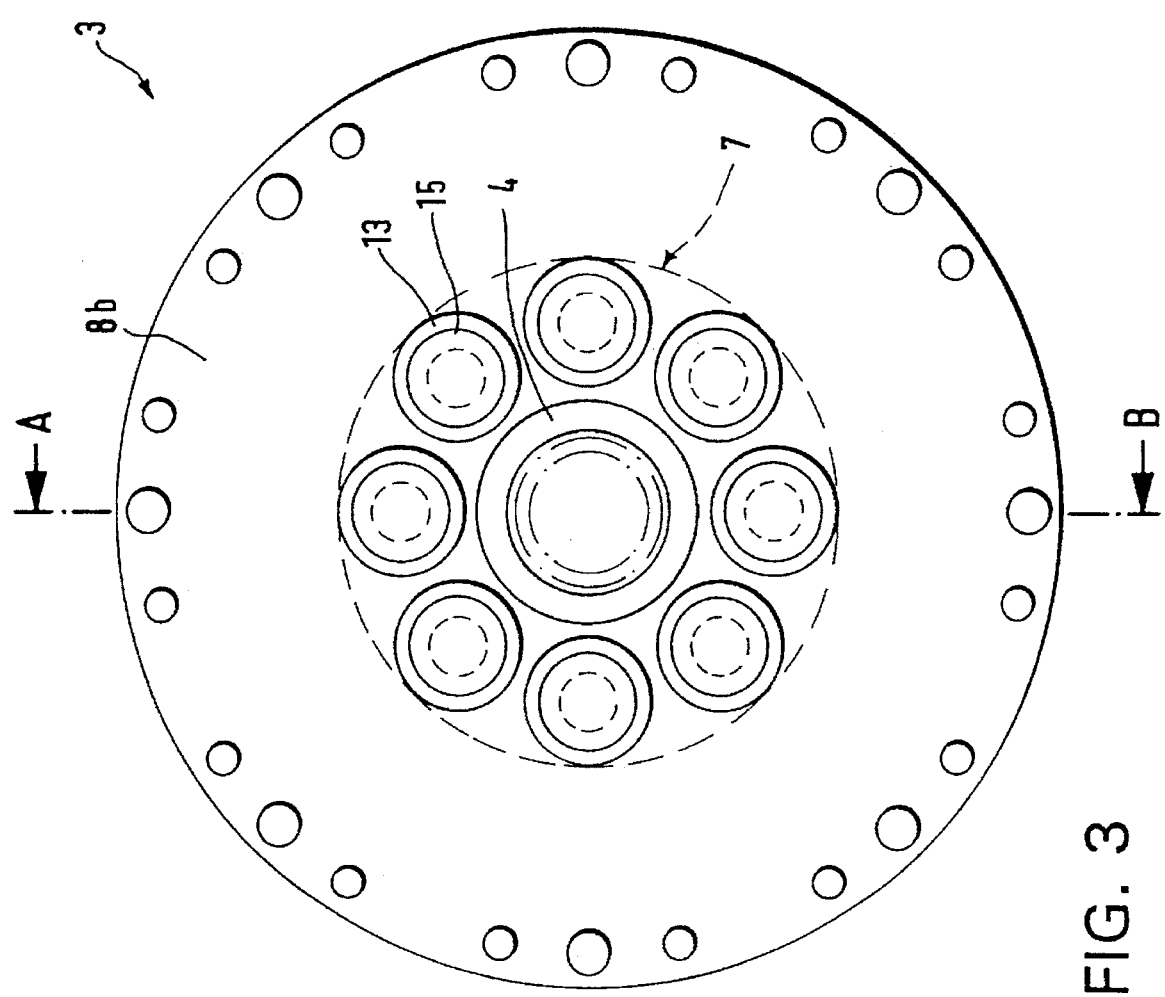
FIG. 3 shows a partial plan view of an additional variant embodiment.

FIG. 3 shows a partial plan view and a partial section of an embodiment of a clutch disc 3, in which the carrier plate 8a, in its radially inner area, can have several openings 18, see FIG. 3a, distributed over the circumference of carrier plate 8b. Elastic bushings 13 can be inserted into the openings 18 of the carrier plate 8b. The bushings can thereby extend in the axial direction beyond the material thickness of the carrier plate 8b, and the bushings 13 can surround the carrier plate 8b in the radial direction to form an interlock. It is also essentially possible to fasten these elastic bushings 13 into the openings 18 by a vulcanization process.

The bushings 13 can essentially form an intermediate diameter which has the value Da, which intermediate diameter Da can also essentially be the diameter of the flange 7 of the hub 4. The flange 7, with respect to the bushings 13, can thereby form a surface 10 which can extend essentially radially, with which surface 10 all the bushings 13 can be in contact. The fastening of bushings 13 with surface 10 can Be accomplished by rivets 15, which rivets 15 can preferably be oriented parallel to the axis of rotation 6.

The rivets 15 in this case can be designed as stepped rivets. The rivets 15 can be riveted to the flange 7 of the hub 4. Each rivet 15 can preferably penetrate, by means of its larger diameter, an opening in the corresponding bushing 13. Each rivet 15, on the side of the carrier plate 8 away from the surface 10, can preferably have a head with a larger diameter to hold the bushings 13. The function of this clutch disc 3 is essentially the same as the function of the embodiments described further above.

To summarize, in accordance with an embodiment of the present invention, carrier plate 8b can have a plurality of openings 18, which openings 18 can preferably surround the inner circumference of carrier plate 8. An elastic bushing 13 can be inserted into each opening 18 of carrier plate 8b whereby each of the elastic bushings 13 can preferably extend axially beyond both sides of the thickness of carrier plate 8b. By axially surrounding the openings 18 of carrier plate 8b, the plurality of bushings 13 can essentially be interlocked with carrier plate 8b. The interlock between the elastic bushings 13 and carrier plate 8b can be essentially further reinforced by fastening the bushings 13 onto carrier plate by a vulcanization process. As shown in FIG. 3a, the plurality of bushings 13 can together form a diameter Da with respect to the central rotational axis of carrier plate 8b. The diameter Da of the plurality of bushings 13 can preferably be essentially the same as the diameter of flange 7. The surface 10 of flange 7 can then be in contact with one side of the plurality of bushings 13, which one side of each bushing 13 essentially faces away from carrier plate 8b. The carrier plate 8b, the bushings 13, and the flange 7 can preferably be fastened by rivets 15, which rivets 15 can preferably comprise stepped rivets. Each rivet can be inserted through flange 7 and therethrough into an opening of the corresponding bushing 13. As stepped rivets, the rivets 15 can have a portion with a larger diameter, which larger diameters can preferably be inserted into the openings of bushings 13. The end of each rivet 15 can then be fastened with the carrier plate 8b by a rivet head, which rivet head can preferably have a diameter essentially larger than the diameter of the holes in the bushings 13. The rivets 15 can thereby fasten the carrier plate 8 with the elastic bushings 13 and the flange 7.

In accordance with at least one embodiment of the present invention, rivets 15 and rivets 16 can, alternatively, be embodied by appropriate devices, other than those described above, for fastening carrier plate 8b with the flange 7 and the elastic elements such as rang wheel 11, 12 or bushings 13.

Some examples of clutch assemblies and various components associated therewith which could possibly utilize the present invention may be disclosed in the following U.S. Patents: U.S. No. 4,684,007 to Maucher, entitled "Clutch Plate"; U.S. Pat. No. 4,635,780 to Wiggert, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietech et el., dated May 18, 1993 and entitled "Slave Cylinder for a Hydraulic Actuating System of a Motor Vehicle Friction Clutch"; U.S. Pat. No. 5,052,279 to Limbauher and Fadlet, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Types of clutch assemblies having pedal linkages which could be utilized in accordance with the present invention may be disclosed in the following U.S. Patents: U.S. Pat. No. 4,987,983 to Adams, dated Jan. 29, 1991, entitled "Dual-mode Powered Clutch Actuator"; U.S. Pat. No. 5,139,126 to Perezt dated Aug. 18, 1992, entitled "Control Device for a clutch, In Particular for an Automotive Vehicle"; and U.S. Pat. No. 5,217,097 to Lasoen, dated Jun. 8, 1993, entitled "Control System for a Fluid Pressure Operated Clutch".

Hydraulic braking systems which could also possibly utilize the present invention may be disclosed in the following U.S. Patents: U.S. Pat. No. 4,634,190 to Wupper, entitled "Hydraulic Brake System With slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

Some examples of elastomeric materials that could be utilized in accordance with the present invention may be disclosed in the following U.S. Patents: U.S. Pat. No. 5,231,143 entitled "High-temperature Oil-resistant Elastomere" to B. P. Goodrich; U.S. Pat. No. 5,231,159 entitled "High Temperature Resistant Molded Elastomer" to Gates; U.S. Pat. No. 5,240,976 entitled "N,N'-Alkenylene Amine/Mercaptotolylimidazole Blends as High Temperature Antioxidants for Elastomers" to Ciba-Geigy; U.S. Pat. No. 5,300,573 entitled "High Temperature Stable, Low Solvent Swelling Thermoplastic Elastomer Compositions" to Advanced Elastomer Systems; U.S. Pat. No. 4,958,713 entitled "Thermal Barrier for Clutch Actuation Element" to Eaton; and U.S. Pat. No. 5,076,410 entitled "Friction Facing Material and Carrier Assembly" to Automotive Products.

Some examples of fastening elements which may be utilized in accordance with the present invention may be found in the following U.S. Patents: U.S. Pat. No. 5,188,008 entitled "Cluster Nut Tool" to States; U.S. Pat. No. 5,190,423 entitled "Locking Fastener" to Ewing; U.S. Pat. No. 5,195,858 entitled "Fastener Apparatus for Locking Together Two Components" to Camlot; and U.S. Pat. No. 5,195,859 entitled "Fastener for Joining a Plurality of Layers" to Glascrew Company.

One feature of the invention resides broadly in the clutch disc for a friction clutch, comprising a hub with internal gear teeth for non-rotational attachment to a drive shaft which defines an axis of rotation, a flange which projects approximately radially from the hub, a carrier plate to hold friction linings, as well as an elastic connection between the carrier plate and flange, characterized by the fact that between the flange 7 and the radially inner area of the carrier plate 8 there are one or more elastic elements 11, 12, 13 which are in contact axially both with the flange 7 and with the carrier plate 8 by means of a surface 10 which extends essentially radially, and are fastened by means of rivets 15, 16 which run axially.

Another feature of the invention resides broadly in the clutch disc characterized by the fact that there is an elastic element in the form of a ring wheel 12, which is oriented concentric to the axis of rotation 6, the outside diameter Da of which is essentially equal to the outside diameter of the flange 7, the carrier plate 8 runs on the side of the ring plate 12 farther from the flange 7, and has an inside diameter Di corresponding approximately to that of the ring plate 12, and alternating stepped rivets 16—distributed over the circumference—connect the ring plate to the flange 7 and to the carrier plate 8 respectively.

Yet another feature of the invention resides broadly in the clutch disc characterized by the fact that there is an elastic element in the form of a ring wheel 11, which is oriented concentric to the axis of rotation 6, whereby the flange 7 has a smaller outside diameter Da than the inside diameter Di of the carrier plate 8 (radial gap 17) and the two are aligned in the radial direction, and the ring wheel 11 has a larger outside diameter Daa than the inside diameter Di of the carrier plate 8 and a smaller inside diameter Dii than the outside diameter Da of the flange 7, and the ring plate 11 is in contact by means of one axial side against the flange 7 and the carrier plate 8, and is fastened by means of one set of stepped rivets 15 to the flange 7 and one set of stepped rivets 15 to the carrier plate 8.

Still another feature of the invention resides broadly in the clutch disc characterized by the fact that the carrier plate 8, on an intermediate diameter oriented concentric to the axis of rotation 6, has several openings 18 distributed around the circumference, in each of which an elastic element in the form of a bushing 12 is inserted, all the bushings 13 are axially in contact with the flange 17, and are riveted to the flange 7 by means of stepped rivets 15 which penetrate the bushings 13.

A further feature of the invention resides broadly in the clutch disc characterized by the fact that the bushings 13 have an axial length which is greater than the thickness of the material of the carrier plate 8.

Another feature of the invention resides broadly in the clutch disc characterized by the fact that the bushings 13 radially surround the carrier plate 8 outside the openings 18.

Yet another feature of the invention resides broadly in the clutch disc characterized by the fact that the bushings 13 are vulcanized to the carrier plate 8.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application P 44 24 186.0, filed on Jul. 8, 1994, having inventors Klaus Memmel, Günter Wawrzik, Winfried Stürmer, and Herald Jeppe, and DE-OS P 44 24 186.0 and DE-PS P 44 24 186.0, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A clutch disc for a motor vehicle clutch, said clutch disc comprising:

a hub;

said hub having an axis of rotation;

said hub comprising a flange;

a carrier plate;

said carrier plate comprising friction lining means;

elastic means for connecting said carrier plate and said hub flange;

said elastic connecting means comprising first connecting means and second connecting means;

said first connecting means comprising means for connecting said hub flange to said elastic connecting means;

said second connecting means comprising means for connecting said carrier plate to said elastic connecting means;

said elastic connecting means comprising at least one elastic element;

said at least one elastic element being disposed to connect said hub flange and said carrier plate;

said at least one elastic element comprising an elastic portion; and said elastic portion being disposed between said first connecting means and said second connecting means for separating said first connecting means and said second connecting means to minimize noise conduction between said hub flange and said carrier plate.

2. The clutch disc according to claim 1, wherein:

said first connecting means comprises means for fastening said at least one elastic element to said hub flange;

said second connecting means comprises means for fastening said at least one elastic element to said carrier plate; and said elastic portion is disposed between said carrier plate fastening means and said hub flange fastening means.

3. The clutch disc according to claim 2, wherein at least one of: said hub flange fastening means and said carrier plate fastening means comprises a plurality of rivets.

4. The clutch disc according to claim 3, wherein:

said at least one elastic element is disposed substantially concentrically about an axis;

said elastic element axis is disposed generally parallel to the rotational axis of said hub disc;

said at least one elastic element has an axial thickness dimension;

said at least one elastic element comprises a first side and a second side;

said first side and said second side being separated by the axial thickness of said at least one elastic element;

said first side is disposed to project radially with respect to the elastic element axis;

said second side is disposed to project radially with respect to the elastic element axis;

one of: said first side and said second side is disposed to contact said hub flange;

said at least one elastic element comprises at least one rivet hole;

said at least one rivet hole is disposed substantially parallel to the rotational axis; and said at least one rivet hole is disposed to receive a rivet of said plurality of rivets.

5. The clutch disc according to claim 4, wherein:

said at least one elastic element is an annular ring;

said annular ring being disposed concentrically with respect to said axis of rotation of said hub;

said annular ring being disposed substantially adjacent said hub flange and said carrier plate;

said annular ring having an inner circumference and an outer circumference;

said hub flange having an outer circumference;

said outer circumference of said annular ring being disposed at a first radial distance from said axis of rotation of said hub;

said outer circumference of said hub flange being disposed at a second radial distance from said axis of rotation of said hub;

said first radial distance of said annular ring being generally similar to said second radial distance of said hub flange;

said carrier plate having an inner circumference;

said inner circumference of said annular ring being disposed at a third radial distance from said axis of rotation of said hub;

said inner circumference of said carrier plate being disposed at a fourth radial distance from said axis of rotation of said hub;

said third radial distance of said annular ring being generally similar to said fourth radial distance of said carrier plate;

said carrier plate having a first side and a second side;

said second side of said carrier plate being disposed both adjacent and in contact with said first side of said annular ring;

said first side of said carrier plate being disposed opposite said second side and facing away from said annular ring;

said hub flange having a first side and a second side;

said first side of said hub flange being disposed both adjacent and in contact with said second side of said annular ring;

said second side of said hub flange being disposed opposite said first side of said flange and facing away from said annular ring;

said carrier plate comprising a first set of apertures;

said first set of apertures being disposed circumferentially about said carrier plate;

said carrier plate comprising a first surface;

said hub flange comprising a second set of apertures;

said second set of apertures being disposed circumferentially about said hub flange;

said hub flange comprising a second surface;

said second surface of said hub flange being disposed opposite and facing away from said first surface of said carrier plate;

said first set of apertures and said second set of apertures being alignedly disposed with respect to one another;

said at least one rivet hole of said annular ring comprising a plurality of rivet holes;

said plurality of rivet holes comprising a first set of rivet holes and a second set of rivet holes;

said first set of rivet holes being alignedly disposed with said first set of apertures;

said second set of rivet holes being alignedly disposed with said second set of apertures;

said plurality of rivets comprising a first set of rivets and a second set of rivets;

said first set of rivets being disposed to pass through said first set of apertures and said first set of rivet holes;

said second set of rivets being disposed to pass through said second set of apertures and said second set of rivet holes;

each of said rivets comprising a rivet head;

said rivet heads being disposed to alternately project from said first set of apertures and said second set of apertures;

each rivet head of said first set of rivets projects from said first surface;

each rivet head of said second set of rivets projects from said second surface;

said carrier plate fastening means comprising:
said first set of apertures;
said first set of rivet holes; and
said first set of rivets; and said hub flange fastening means comprising:
said second set of apertures;
said second set of rivet holes; and
said second set of rivets.

6. The clutch disc according to claim 4, wherein:

said at least one elastic element is an annular ring;

said annular ring being disposed concentrically with respect to said axis of rotation of said hub;

said at least one rivet hole of said annular ring comprising a plurality of rivet holes;

said plurality of rivet holes comprising a first set of rivet holes and a second set of rivet holes;

said annular ring being disposed substantially adjacent said flange and said carrier plate;

said annular ring having an inner circumference and an outer circumference;

said carrier plate having an inner circumference;

said hub flange having an outer circumference;

said outer circumference of said hub flange being disposed at a first radial distance with respect to said axis of rotation of said hub;

said inner circumference of said carrier plate being disposed at a second radial distance with respect to said axis of rotation of said hub;

said first radial distance being substantially smaller than said second radial distance;

the difference between said first radial distance and said second radial distance comprising a radial clearance between said carrier plate and said hub flange;

said inner circumference of said carrier plate being disposed in a radial plane with respect to said outer circumference of said hub flange;

said outer circumference of said annular ring being disposed at a third radial distance with respect to said axis of rotation of said hub;

said third radial distance of said annular ring being substantially greater than said second radial distance of said carrier plate;

said inner circumference of said annular ring being disposed at a fourth radial distance with respect to said axis of rotation of said hub;

said fourth radial distance of said annular ring being substantially smaller than said first radial distance of said hub flange;

said carrier plate having a first side and a second side;

said hub flange having a first side and a second side;

said second side of said annular ring being disposed adjacent and in contact with said first side of said carrier plate and said first side of said hub flange;

said first side of said annular ring facing away from said carrier plate and said hub flange;

said carrier plate comprising said plurality of rivets;

said plurality of rivets comprising a first set of rivets;

said first set of rivets being disposed adjacent said inner circumference of said carrier plate;

said first of rivet holes being alignedly disposed with respect to said first set of rivets;

said hub flange comprising a second set of rivets;

said second set of rivets being disposed concentrically adjacent said outer circumference of said hub flange;

said second set of rivet holes being alignedly disposed with respect to said second set of rivets;

said carrier plate fastening means comprising said first set of rivets and said first set of rivet holes; and said hub flange fastening means comprising said second set of rivets and said second set of rivet holes.

7. The clutch disc according to claim 4, wherein:

said at least one elastic element comprises a plurality of elastic bushings;

said carrier plate being disposed concentrically with respect to said axis of rotation of said hub;

said carrier plate having an inner circumference;

said carrier plate comprising a plurality of apertures;

said plurality of apertures being disposed adjacent said inner circumference of said carrier plate;

said plurality of elastic bushings being disposed in said plurality of apertures in said carrier plate;

said plurality of elastic bushings being disposed to interlock with said plurality of apertures in said carrier plate;

said carrier plate fastening means comprising said interlocking of said plurality of elastic bushings with said plurality of apertures in said carrier plate;

said plurality of elastic bushings having radially outermost portions disposed at a first radial distance with respect to said axis of rotation of said hub;

said hub flange being disposed substantially adjacent said carrier plate;

said hub flange having an outer circumference;

said outer circumference of said hub flange being disposed at a second radial distance from said axis of rotation of said hub;

said first radial distance of said plurality of bushings being generally similar to said second radial distance of said hub flange;

said hub flange having a first side and a second side;

said first side of each of said plurality of bushings being disposed adjacent and axially in contact with said second side of said hub flange;

said first side of said hub flange being disposed opposite said second side and facing away from said plurality of bushings;

each of said plurality of rivets extending through a corresponding rivet hole of each of said plurality of bushings and extending into said hub flange; and said hub flange fastening means comprising said plurality of rivets and each rivet hole of said plurality of bushings.

8. The clutch disc according to claim 7, wherein:

said carrier plate has a thickness dimension;

said thickness dimension of said carrier plate having a first axial dimension;

each axial length of each of said bushings having a second axial dimension; and said second axial dimension of each of said bushings being substantially greater than said first axial dimension of said carrier plate.

9. The clutch disc according to claim 8, wherein:

each of said plurality of apertures disposed in said carrier plate has a radial dimension;

each of said plurality of bushings has a radial dimension;

said radial dimension of each of said bushings being substantially greater than said radial dimension of said plurality of apertures in said carrier plate;

each of said plurality of apertures comprising edges;

said edges of each of said apertures being disposed outwardly with respect to a corresponding one of said apertures; and at least a portion of each of said bushings being disposed to surround the edges of its corresponding said aperture in said carrier plate.

10. The clutch disc according to claim 9, wherein said carrier plate fastening means comprises a vulcanized connection between said bushings and said carrier plate.

11. A clutch disc for a motor vehicle clutch, said clutch disc comprising:

a hub disposed about a rotational axis;

a carrier plate;

said carrier plate comprising friction lining means;

means for fastening said hub to said carrier plate;

said fastening means comprising means for elastically connecting said hub to said carrier plate;

said fastening means comprising first fastening means and second fastening means;

said first fastening means comprising means for fastening said elastic connecting means to said hub;

said second fastening means comprising means for fastening said elastic connecting means to said carrier plate;

said elastic connecting means comprising at least one elastic element;

said at least one elastic element comprising an elastic portion; and said elastic portion being disposed between said first fastening means and said second fastening means to separate said first fastening means and said second fastening means to minimize noise conduction between said hub and said carrier plate.

12. The clutch disc according to claim 11, wherein:

said first fastening means comprises means for fastening said at least one elastic element to said hub; and said second fastening means comprises means for fastening said at least one elastic element to said carrier plate.

13. The clutch disc according to claim 2, wherein at least one of: said hub fastening means and said carrier plate fastening means comprises at least one rivet.

14. The clutch disc according to claim 3, wherein:

said at least one elastic element is disposed substantially concentrically about an axis;

said elastic element axis is disposed generally parallel to the rotational axis of said hub disc;

said at least one elastic element has an axial thickness dimension;

said at least one elastic element comprises a first surface and a second surface;

said first surface and said second surface are separated by the axial thickness of said at least one elastic element;

said first side of said at least one elastic element is disposed to project radially with respect to the elastic element axis;

said second side of said at least one elastic element is disposed to project radially with respect to the elastic element axis;

one of: said first side and said second side is disposed to contact said hub;

said at least one elastic element comprises at least one rivet hole;

said at least one rivet hole is disposed substantially parallel with said elastic element axis; and said at least one rivet hole is disposed to receive said at least one rivet.

15. The clutch disc according to claim 4, wherein said at least one elastic element comprises an elastomeric element comprising a polymer.

16. The clutch disc according to claim 5, wherein:
said at least one elastic element is an annular ring;
said annular ring being disposed concentrically with respect to said axis of rotation of said hub;
said hub comprising a flange;
said flange being disposed to radially project from said hub;
said annular ring being disposed substantially adjacent said flange and said carrier plate;
said annular ring having an inner circumference and an outer circumference;
said flange having an outer circumference;
said outer circumference of said annular ring being disposed at a first radial distance from said axis of rotation of said hub;
said outer circumference of said flange being disposed at a second radial distance from said axis of rotation of said hub;
said first radial distance of said annular ring being generally similar to said second radial distance of said flange;
said carrier plate having an inner circumference;
said inner circumference of said annular ring being disposed at a third radial distance from said axis of rotation of said hub;
said inner circumference of said carrier plate being disposed at a fourth radial distance from said axis of rotation of said hub;
said third radial distance of said annular ring being generally similar to said fourth radial distance of said carrier plate;
said carrier plate having a first side and a second side;
said second side of said carrier plate being disposed both adjacent and in contact with said first side of said annular ring;
said first side of said carrier plate being disposed opposite said second side and facing away from said annular ring;
said flange having a first side and a second side;
said first side of said flange being disposed both adjacent and in contact with said second side of said annular ring;
said second side of said flange being disposed opposite said first side of said flange and facing away from said annular ring;
said carrier plate comprising a first set of apertures;
said first set of apertures being disposed circumferentially about said carrier plate;
said carrier plate comprising a first surface;
said flange comprising a second set of apertures;
said second set of apertures being disposed circumferentially about said flange;
said flange comprising a second surface;
said second surface of said flange being disposed opposite and facing away from said first surface of said carrier plate;
said first set of apertures and said second set of apertures being alignedly disposed with respect to one another;
said at least one rivet hole of said annular ring comprising a plurality of rivet holes;
said plurality of rivet holes comprising a first set of rivet holes and a second set of rivet holes;
said first set of rivet holes being alignedly disposed with said first set of apertures;
said second set of rivet holes being alignedly disposed with said second set of apertures;
said at least one rivet comprises a plurality of rivets;
said plurality of rivets being disposed in said first set of apertures and said second set of apertures;
said plurality of rivets comprising a first set of rivets and a second set of rivets;
said first set of rivets being disposed in said first set of apertures;
said second set of rivets being disposed in said second set of apertures;
each of said rivets comprising a rivet head;
said rivet heads being disposed to alternately project from said first set of apertures and said second set of apertures;
each rivet head of said first set of rivets projects from said first surface;
each rivet head of said second set of rivets projects from said second surface;
said carrier plate fastening means comprising:
said first set of apertures;
said first set of rivet holes; and
said first set of rivets; and
said flange fastening means comprising:
said second set of apertures;
said second set of rivet holes; and
said second set of rivets.

17. The clutch disc according to claim 15, wherein:
said at least one elastic element is an annular ring;
said annular ring being disposed concentrically with respect to said axis of rotation of said hub;
said annular ring having a first side and a second side;
said first side and said second side of said annular ring being disposed to project radially with respect to said axis of rotation of said hub;
said at least one rivet hole of said annular ring comprising a plurality of rivet holes;
said plurality of rivet holes comprising a first set of rivet holes and a second set of rivet holes;
said hub comprising a flange;
said flange being disposed to radially project from said hub;
said annular ring being disposed substantially adjacent said flange and said carrier plate;
said annular ring having an inner circumference and an outer circumference;
said carrier plate having an inner circumference;
said flange having an outer circumference;
said outer circumference of said flange being disposed at a first radial distance with respect to said axis of rotation of said hub;
said inner circumference of said carrier plate being disposed at a second radial distance with respect to said axis of rotation of said hub;
said first radial distance being substantially smaller than said second radial distance;
the difference between said first radial distance and said second radial distance comprising a radial clearance between said carrier plate and said flange;

said inner circumference of said carrier plate being disposed in a radial plane with respect to said outer circumference of said flange;

said outer circumference of said annular ring being disposed at a third radial distance with respect to said axis of rotation of said hub;

said third radial distance of said annular ring being substantially greater than said second radial distance of said carrier plate;

said inner circumference of said annular ring being disposed at a fourth radial distance with respect to said axis of rotation of said hub;

said fourth radial distance of said annular ring being substantially smaller than said first radial distance of said flange;

said carrier plate having a first side and a second Side;

said flange having a first side and a second side;

said second side of said annular ring being disposed adjacent and in contact with said first side of said carrier plate and said first side of said flange;

said first side of said annular ring facing away from said carrier plate and said flange;

said at least one rivet comprising a plurality of rivets;

said plurality of rivets comprising a first set of rivets and a second set of rivets;

said carrier plate comprising said first set of rivets;

said first set of rivets being disposed adjacent said inner circumference of said carrier plate;

said first set of rivet holes being alignedly disposed with respect to said first set of rivets;

said flange comprising said second set of rivets;

said second set of rivets being disposed concentrically adjacent said outer circumference of said flange;

said second set of rivet holes being alignedly disposed with respect to said second set of rivets;

said carrier plate fastening means comprising said first set of rivets and said first set of rivet holes; and said hub fastening means comprising said second set of rivets and said second set of rivet holes.

18. The clutch disc according to claim 15, wherein:

said at least one elastic element comprises a plurality of elastic bushings;

said carrier plate being disposed concentrically with respect to said axis of rotation of said hub;

said carrier plate having an inner circumference;

said carrier plate comprising a plurality of apertures;

said plurality of apertures being disposed adjacent said inner circumference of said carrier plate;

said plurality of elastic bushings being disposed in said plurality of apertures in said carrier plate;

said plurality of elastic bushings being disposed to interlock with said plurality of apertures in said carrier plate;

said carrier plate fastening means comprising said interlocking of said plurality of elastic bushings with said plurality of apertures in said carrier plate;

said plurality of elastic bushings having radially outermost portions disposed at a first radial distance with respect to said axis of rotation of said hub;

said hub comprising a flange;

said flange being disposed to radially project from said hub;

said flange being disposed substantially adjacent said carrier plate;

said flange having an outer circumference;

said outer circumference of said flange being disposed at a second radial distance from said axis of rotation of said hub;

said first radial distance of said plurality of bushings being generally similar to said second radial distance of said flange;

said flange having a first side and a second side;

said first side of each of said plurality of bushings being disposed adjacent and axially in contact with said second side of said flange;

said first side of said flange being disposed opposite said second side and facing away from said plurality of bushings;

said at least one rivet comprises a plurality of rivets;

each of said plurality of rivets extending through a corresponding rivet hole of each of said plurality of bushings and extending into said flange; and said flange fastening means comprising said plurality of rivets and each rivet hole of said plurality of bushings.

19. The clutch disc according to claim 18, wherein:

said carrier plate has a thickness dimension;

said thickness dimension of said carrier plate having a first axial dimension;

each axial length of each of said bushings having a second axial dimension; and said second axial dimension of each of said bushings being substantially greater than said first axial dimension of said carrier plate.

20. The clutch disc according to claim 19, wherein:

each of said plurality of apertures disposed in said carrier plate has a radial dimension;

each of said plurality of bushings has a radial dimension;

said radial dimension of each of said bushings being substantially greater than said radial dimension of said plurality of apertures in said carrier plate;

each of said plurality of apertures comprising edges;

said edges of each of said apertures being disposed outwardly with respect to the corresponding aperture;

at least a portion of each of said bushings being disposed to surround the edges of its corresponding aperture in said carrier plate; and said carrier plate fastening means comprising a vulcanized connection between said bushings and said carrier plate.

* * * * *

UNITED STATES PATENT AND TRADEMARK OFFICE
CERTIFICATE OF CORRECTION

PATENT NO. : 5,662,200                                       Page 1 of 4
DATED      : September 2, 1997
INVENTOR(S): Klaus MEMMEL, Günter WAWRZIK, Winfried STÜRMER and
             Harald JEPPE It is certified that error appears in the above-identified patent and that said Letters Patent is hereby corrected as shown below:

In column 2, line 50, after 'clutch', delete "dieu" and insert --disc--.

In column 4, line 33, after '11', delete "van" and insert --can--.

In column 5, line 12, after the first occurrence of 'diameter', delete "Dad" and insert --Daa--.

In column 5, line 13, before 'of', delete "Dad" and insert --Daa--.

In column 5, line 15, after 'wheel', delete "21" and insert --11--.

In column 5, line 60, after the third occurrence of 'the' insert --purpose--.

UNITED STATES PATENT AND TRADEMARK OFFICE
CERTIFICATE OF CORRECTION

Page 2 of 4

PATENT NO. : 5,662,200
DATED : September 2, 1997
INVENTOR(S) : Klaus MEMMEL, Günter WAWRZIK, Winfried STÜRMER and Harald JEPPE It is certified that error appears in the above-identified patent and that said Letters Patent is hereby corrected as shown below:

In column 7, line 25, after 'as', delete "rang" and insert --ring--.

In column 7, line 30, after 'to', delete "Wiggert," and insert --Wiggen,--.

In column 7, line 41, after 'to', delete "Grosspietech" and insert --Grosspietsch--.

In column 7, line 44, after 'to', delete "Limbauher" and insert --Limbacher--.

In column 7, line 44, after 'and', delete "Fadlet," and insert --Fadler,--.

In column 7, line 56, before 'dated', delete "Perezt" and insert --Perez,--.

UNITED STATES PATENT AND TRADEMARK OFFICE
CERTIFICATE OF CORRECTION

PATENT NO. : 5,662,200
DATED : September 2, 1997
INVENTOR(S) : Klaus MEMMEL, Günter WAWRZIK, Winfried STÜRMER and Harald JEPPE It is certified that error appears in the above-identified patent and that said Letters Patent is hereby corrected as shown below:

In column 8, lines 6-7, before 'to', delete "Elastomere" and insert --Elastomers--.

In column 8, line 7, after 'B.', delete "P." and insert --F.--.

In column 8, line 24, after 'to', delete "Camlot;" and insert --Camloc;--.

In column 9, line 4, after 'bushing', delete "12" and insert --13--.

In column 9, line 36, after 'Application' insert --No.--.

UNITED STATES PATENT AND TRADEMARK OFFICE
CERTIFICATE OF CORRECTION

PATENT NO. : 5,662,200
DATED : September 2, 1997
INVENTOR(S) : Klaus MEMMEL, Günter WAWRZIK, Winfried STÜRMER and Harald JEPPE It is certified that error appears in the above-identified patent and that said Letters Patent is hereby corrected as shown below:

In column 9, line 38, after the first occurrence of 'and', delete "Herald" and insert --Harald--.

In column 14, line 38, Claim 13, after 'claim', delete "2," and insert --12,--.

In column 14, line 41, Claim 14, after 'claim', delete "3," and insert --13,--.

In column 15, line 1, Claim 15, after 'claim', delete "4," and insert --14,--.

In column 15, line 4, Claim 16, after 'claim', delete "5," and insert --15,--.

Signed and Sealed this

Twenty-ninth Day of September, 1998

Attest:

BRUCE LEHMAN

*Attesting Officer*  *Commissioner of Patents and Trademarks*